United States Patent [19]

Kinoshita

[11] Patent Number: 4,635,831
[45] Date of Patent: * Jan. 13, 1987

[54] GATE DRIVING DEVICE

[75] Inventor: Kinjiro Kinoshita, Himeji, Japan

[73] Assignee: Yamato Scale Company, Limited, Japan

[*] Notice: The portion of the term of this patent subsequent to Jun. 11, 2002 has been disclaimed.

[21] Appl. No.: 700,593

[22] Filed: Feb. 11, 1985

Related U.S. Application Data

[63] Continuation-in-part of Ser. No. 537,036, Sep. 29, 1983, Pat. No. 4,522,321.

[30] Foreign Application Priority Data

Oct. 5, 1982 [JP] Japan .................. 57-175457

[51] Int. Cl.⁴ .................................................. E16K 31/52
[52] U.S. Cl. ........................................ 222/504; 177/25; 74/519; 222/556
[58] Field of Search .............. 74/96, 519, 42, 43, 74/47, 51; 222/504, 556, 505; 251/228, 300, 303; 177/25

[56] References Cited

U.S. PATENT DOCUMENTS 1,434,492  8/1982  Hirano .................. 177/25
1,937,232 11/1933  Kuehling ............... 222/556 X
2,131,034  9/1938  Beck ..................... 222/504 X
2,611,465  9/1952  Simon ................... 222/504 X
2,698,602  1/1955  Olcott ................... 222/504 X
4,522,321  6/1985  Kinoshita .............. 222/504
4,545,446 10/1985  Kokabu ................. 222/556 X

FOREIGN PATENT DOCUMENTS 919638  9/1954  Fed. Rep. of Germany ...... 222/501
692088 10/1930  France .................... 222/505
50-149059  5/1974  Japan .

Primary Examiner—Joseph J. Rolla
Assistant Examiner—P. McCoy Smith
Attorney, Agent, or Firm—Senniger, Powers, Leavitt and Roedel

[57] ABSTRACT

An improved gate driving link mechanism is provided, this mechanism being originally designed for opening and closing a flapdoor type discharge gate of a weighing hopper of top-charge and bottom discharge type, used in a combination weighing device such as disclosed in U.S. Pat. No. 4,344,492, the improvement of which is to add an intermediate bell crank for confining overshoot of the opened gate to avoid unwanted time loss which affects high speed operation of the device and undesirable shock and vibration which affect accuracy of measurement.

3 Claims, 8 Drawing Figures

GATE DRIVING DEVICE

CROSS REFERENCE TO RELATED APPLICATION

This is a continuation-in-part of pending application Ser. No. 537,036 filed Sept. 29, 1983, now U.S. Pat. No. 4,522,321.

BACKGROUND OF THE INVENTION

This invention relates to an improved gate driving device which is used for opening and closing a flapdoor type discharge gate of a weighing cradle or hopper of the "bottom-discharge" type, which is especially useful in an automatic weighing device.

U.S. Pat. No. 4,344,492 discloses a combination weighing machine including a plurality of weighing units each having an automatically loaded and unloaded weighing cradle or hopper. This weighing hopper is of the "bottom-discharge" type and has a flapdoor type discharge gate at its bottom opening. This gate is generally driven by means of link-and-crank mechanism, such as shown in the opened Japanese utility model specification No. 50-149059. However, such prior art mechanisms have suffered from a problem of overshoot which involves unwanted time loss in operation which affects high speed operation of the device and also gives undesirable shock and vibration to the weighing unit to reduce its accuracy of measurement.

Accordingly, an object of this invention is to remove the above problem and provide an improved mechanism for driving such a gate without unwanted overshoot.

SUMMARY OF THE INVENTION

According to this invention, provided is a mechanism for driving a flapdoor type discharge gate pivoted on a horizontal axis at a bottom opening of a hopper, which includes a first bell crank having first and second arms and pivoted on a first generally horizontal axis for receiving an original driving force applied to the first arm, a second bell crank having first and second arms and pivoted on a second generally horizontal axis, and a third bell crank having first and second arms and pivoted on a third generally horizontal axis. A first connecting rod connects the second arm of the first bell crank to the first arm of the second bell crank and a second connecting rod connects the second arm of the third bell crank to the gate. Link means connect the second arm of the second bell crank to the first arm of the third bell crank. As a feature of this invention, the locations and geometries of the bell cranks and connecting rods are selected such that, when the gate is closed, the second arm of the first bell crank and the first connecting rod align substantially on a straight line, and that, when the gate is open, the second arm of the third bell crank and the second connecting rod align substantially on another straight line.

These and other objects and features of this invention will be described in more detail hereinunder with references to the accompanying drawings.

BRIEF DESCRIPTION OF THE DRAWINGS

In the drawings.

Throughout the drawings, the same reference numerals are given to like structural components.

DESCRIPTION OF PREFERRED EMBODIMENTS OF THE INVENTION

Figure 1:
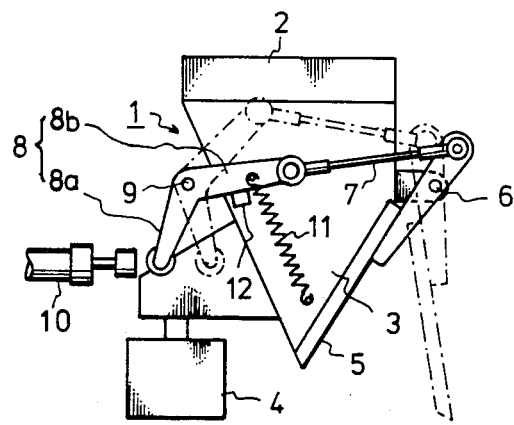
FIG. 1 is a side view representing a conventional gate driving device according to the prior art.

Referring to FIG. 1, a prior art weighing hopper 1 has an entrance opening 2 at its top and an exit opening 3 at its bottom. The hopper 1 is mounted on a weighing unit 4 for weighing products or articles in the hopper 1. The exit opening 3 of the hopper 1 lies in a slanting plane and has a flapdoor type gate 5 which is pivoted on a shaft 6 fixed with respect to the hopper 1 as shown. The gate 5 constitutes a lever mechanism having its fulcrum at the shaft 6 and its distal (upper) end coupled through a connecting rod 7 to a second arm 8b of a bell crank 8 pivoted on a horizontal shaft 9 which is fixed to the hopper 1 parallel to the shaft 6. The bell crank 8 has a first arm 8a whose end faces a plunger of an air cylinder 10 which moves uniformly to rotate the bell crank 8 when actuated. A coil spring 11 is stretched between the second arm 8b of the bell crank 8 and the hopper 1 to urge the gate always to its closed state, and a stop 12 is provided on the hopper 1 for confining the bell crank 8 to this state.

In operation, the air cylinder 10 is actuated to push the arm 8a of the bell crank 8 and rotate it in counterclockwise direction against the tension of the spring 11. This rotation is transferred through the connecting rod 7 to the gate 5 to open it as shown in phantom in the drawing. When the air cylinder 10 is de-actuated, the bell crank 8 is pulled back to the original position by the spring 11 and the gate 5 is closed.

In this prior art gate driving device, however, when the gate 5 is opened, it is abruptly decelerated at the end of the advance (stroke) of the plunger of air cylinder 10 to cause overshoot of the gate 5 which involves unwanted time loss and gives undesirable vibration to the hopper 1 and weighing unit 4. The time loss and vibration and resultant accuracy reduction cause a severe problem when the gate is opened and closed at high speed in order to shorten the cycle time of automatic weighing operation.

Next, the present invention will be described with reference to the embodiments as shown in FIGS. 2 through 6. The first embodiment of FIG. 2 differs from the prior art device of FIG. 1 in that for the connecting rod 7 is substituted a first connecting rod 22, a second bell crank 20 having first and second arms 20a and 20b pivoted on a horizontal shaft 26, and a second connecting rod 24, and in that the gate 5 is pivoted on a horizontal shaft 28 at its upper end. The shafts 9, 26 and 28 are arranged mutually in parallel and fixed with respect to the hopper 1. The second arm 8b of the first bell crank 8 is coupled through the first connecting rod 22 to the first arm 20a of the second bell crank 20 and the second arm 20b of the second bell crank 20 is coupled through the second connecting rod 24 to an intermediate point of the gate 5. It is essential that the geometries and locations of the bell cranks and connecting rods are designed such that the second arm 8b of the first bell crank 8 and the first connecting rod 22 lie on a straight line, as shown in solid lines in the drawing, when the gate 5 is closed, and the second arm 20b of the second bell crank 20 and the second connecting rod 24 lie on another straight line, as shown in phantom in the drawing, when the gate 5 is open. In other words, the first bell crank 8 is at its upper dead point (upper dead center) when the gate 5 is closed, while the second bell crank 20 is its upper dead point (upper dead center) when the gate 5 is open.

Figure 3:
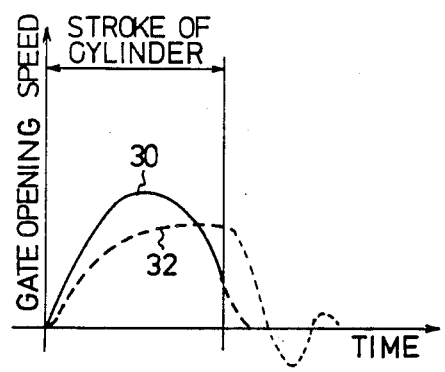
FIG. 3 is a graph showing gate opening speed varying with time in comparison of the devices of FIGS. 1 and 2.
Figure 4:
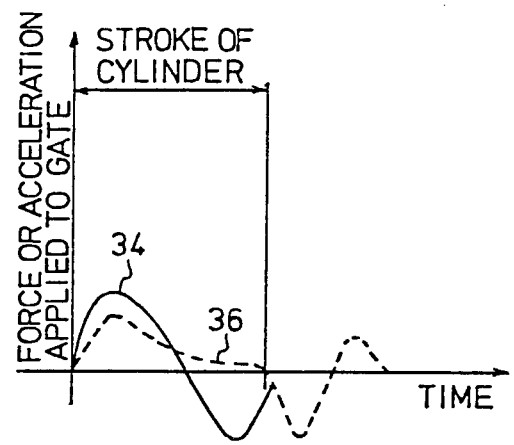
FIG. 4 is a graph showing force or acceleration applied to the gate with respect to time in comparison of the devices of FIGS. 1 and 2.

In operation, when the air cylinder 10 is actuated, its plunger extends at uniform speed to push the first arm 8a of the bell crank 8 to rotate the crank 8 in counter-clockwise direction against the tension of the spring 11. This results in counter-clockwise rotation of the second bell crank 20 through the connecting rod 22. The rotation of the bell crank 20 is transmitted through the second connecting rod 24 to the gate 5 and the gate 5 begins to open. As shown in FIG. 3, the gate opening speed increases along curve 30 as the crank 8 moves away from its upper dead point and reaches its maximum midway of the curve 30. Thereafter, the gate opening speed decreases along curve 30 as the second bell crank 20 draws near its upper dead point and becomes about zero at the end of the stroke of the air cylinder 10. By way of comparison, the dashed curve 32 gives the speed variation in the prior art device shown in FIG. 1. As clearly seen from this comparison, the speed of gate 5 at the end of opening is substantially lower in the present invention. FIG. 4 shows variation of the force or acceleration to which the gate is subjected during the same gate opening process by solid and dashed curves 34 and 36 in the same manner as FIG. 3. When the plunger of air cylinder 10 retracts at uniform speed from the stroke end, the speed and acceleration of the gate follow curves similar to those of FIGS. 3 and 4.

Figure 2:
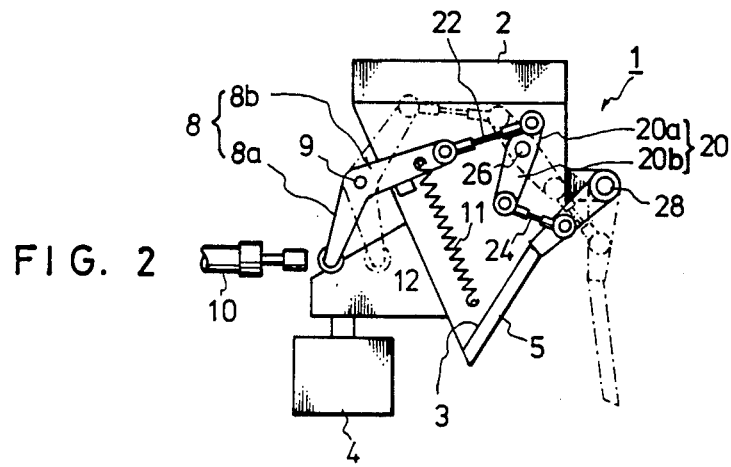
FIG. 2 is a side view representing an embodiment of gate driving device according to this invention.
Figure 5:
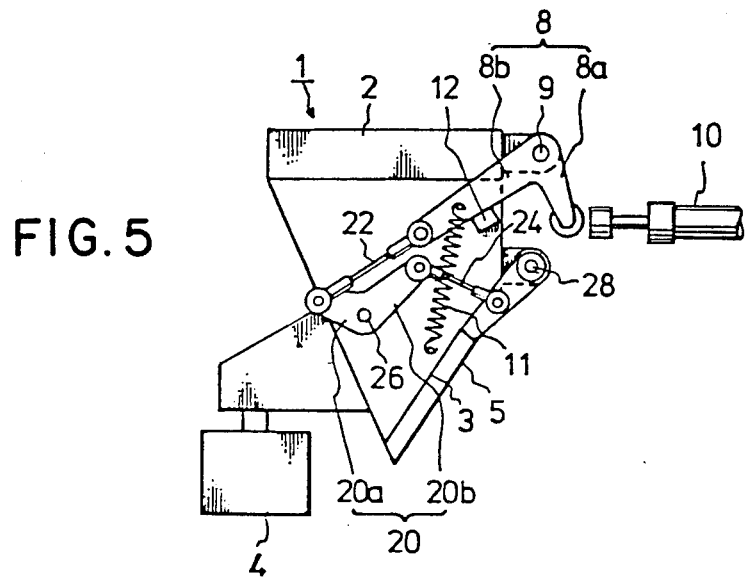
FIG. 5 is a side view representing another embodiment of gate driving device according to this invention, in which the gate is closed.
Figure 6:
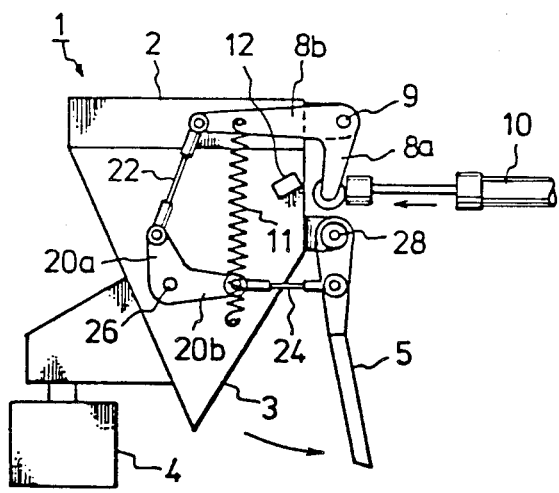
FIG. 6 is a side view of the embodiment of FIG. 5 showing the gate opened.

The second embodiment as shown in FIGS. 5 and 6 is somewhat different in the arrangement of bell cranks and connecting rods from the embodiment of FIG. 2. However, it should be readily understood by reviewing these drawings that both are quite same in principle and operation.

As described above, in the device of this invention, either of the first and second bell cranks 8 and 20 is put in its upper dead point when the gate 5 is in its opened or closed state. Therefore, there will be almost no overshoot of the gate at the both stroke ends. Moreover, as shown in FIGS. 3 and 4, speed and acceleration of the gate at the stroke ends are almost zero and, therefore, the gate will impart little shock and vibration to the weighing unit 4.

Figure 7:
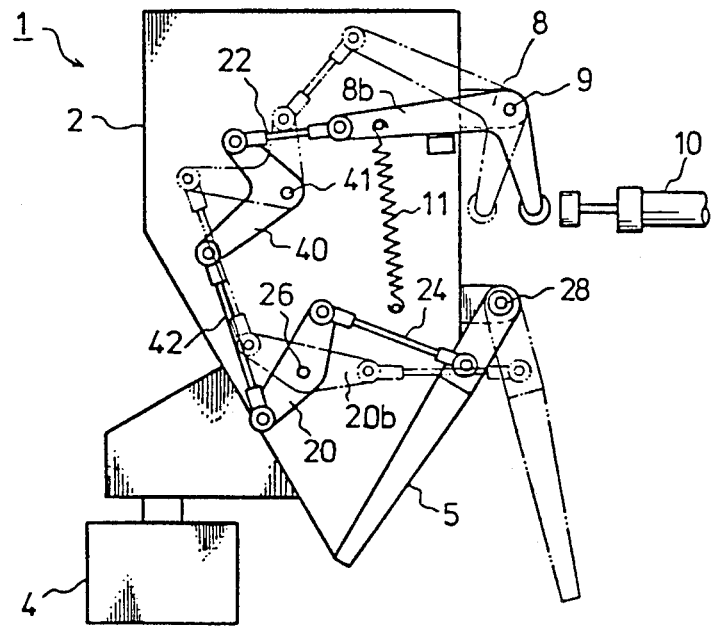
FIGS. 7 and 8 are side views representing further embodiments of gate driving devices according to this invention.
Figure 8:
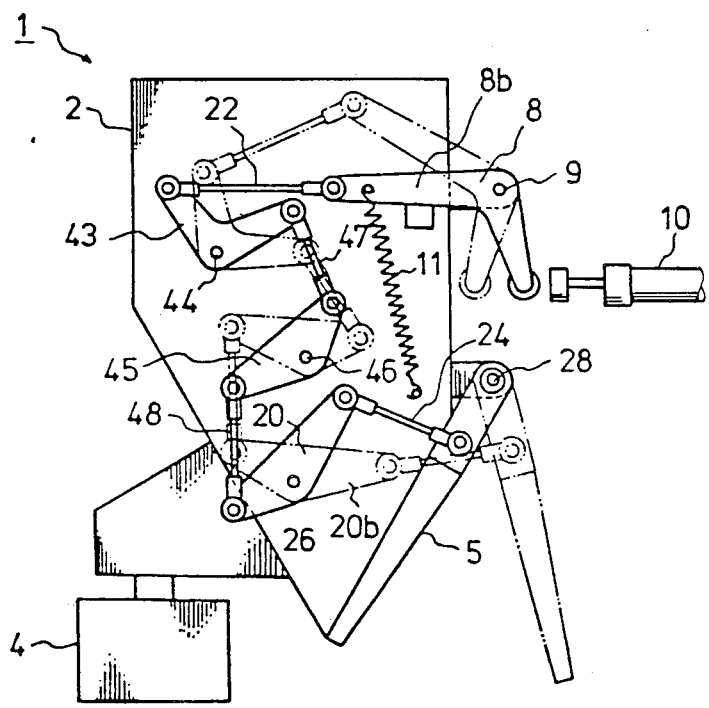

While, in the embodiments as shown in FIGS. 2, 5 and 6, bell crank 20 is connected directly to connecting rod 22, the embodiment of FIG. 7 has another bell crank 40 pivoted at 41 and a connecting rod 42 disposed between bell crank 20 and connecting rod 22, and the embodiment of FIG. 8 has two additional bell cranks 43 and 45 pivoted at 44 and 45, respectively, and connecting rods 47 and 48, disposed between bell crank 20 and connecting rod 22. Although the number of bell cranks and connecting rods is increased in the embodiments of FIGS. 7 and 8, all the embodiments have a common structure which is essential to this invention. That is, as defined in the patent claim, the connecting rod 22 and second arm 8b of bell crank 8 form a straight line as shown in solid when the gate 5 is closed, and the connecting rod 24 and second arm 20b of bell crank 20 form another straight line as shown in phantom when the gate 5 is open.

It should be understood from the above description that from a theoretical viewpoint, any number of properly sized and arranged bell cranks and connecting rods may be used between bell crank 20 and connecting rod 22 to obtain the same operational effect described with respect to the previous embodiments. However, unduly increasing the number of such linking components will result in economical loss and mechanical inaccuracy.

I claim:

1. In a hopper having a discharge opening at the bottom, said opening being provided with a flapdoor type gate; a gate driving device comprising a first bell crank having first and second arms and pivoted on a first generally horizontal axis for receiving an original driving force applied to said first arm, a second bell crank having first and second arms and pivoted on a second generally horizontal axis, a third bell crank having first and second arms and pivoted on a third generally horizontal axis, a first connecting rod connecting the second arm of said first bell crank to the first arm of said second bell crank, a second connecting rod connecting the second arm of said third bell crank to said gate, and link means connecting the second arm of said second bell crank to the first arm of said third bell crank; characterized in that the locations and geometries of said bell cranks and connecting rods are selected such that, when said gate is closed, the second arm of said first bell crank and said first connecting rod align substantially on a straight line, and that, when said gate is open, the second arm of said third bell crank and said second connecting rod align substantially on another straight line.

2. In a hopper having a gate driving device as set forth in claim 1, said link means comprising a third connecting rod.

3. In a hopper having a gate driving device as set forth in claim 1, said link means comprising a fourth bell crank having first and second arms and pivoted on a fourth generally horizontal axis, a third connecting rod connecting the second arm of the second bell crank to the first arm of the fourth bell crank, and a fourth connecting rod connecting the second arm of the fourth bell crank to the first arm of the third bell crank.

* * * * *